United States Patent [19]

Miyazaki et al.

[11] Patent Number: 4,905,573
[45] Date of Patent: Mar. 6, 1990

[54] TANDEN-TYPE VACUUM BOOSTER

[75] Inventors: Yoshihisa Miyazaki; Tsuyoshi Hatada, both of Ueda; Kazuo Miyazaki; Takahiro Hachigo, both of Wako, all of Japan

[73] Assignees: Nissin Kogyo Kabushiki Kaisha, Ueda; Honda Giken Kogyo Kabushiki Kaisha, Tokyo, both of Japan

[21] Appl. No.: 266,466

[22] Filed: Nov. 3, 1988

[30] Foreign Application Priority Data

Nov. 6, 1987 [JP] Japan ................... 62-280395
Nov. 6, 1987 [JP] Japan ................... 62-280396

[51] Int. Cl.⁴ .......................... F01B 19/02; F15B 9/10
[52] U.S. Cl. ...................................... 92/48; 92/98 D; 91/376 R
[58] Field of Search ............... 92/48, 49, 97, 98 D; 91/376 R

[56] References Cited

U.S. PATENT DOCUMENTS

| | | | |
|---|---|---|---|
| 2,980,068 | 4/1961 | Stelzer | 92/48 X |
| 3,478,519 | 11/1969 | Eggstein | 91/376 R X |
| 3,603,208 | 9/1971 | Kytta | 91/376 R |
| 3,613,506 | 10/1971 | Kytta | 91/376 R X |
| 4,475,444 | 10/1984 | Hendrickson | 92/97 X |
| 4,587,884 | 5/1986 | Tsubouchi | 92/97 X |
| 4,718,328 | 1/1988 | Mori et al. | 91/376 R |

FOREIGN PATENT DOCUMENTS 169361 9/1985 Japan ...................... 92/48

Primary Examiner—Robert E. Garrett
Assistant Examiner—Mark A. Williamson
Attorney, Agent, or Firm—Armstrong, Nikaido, Marmelstein, Kubovcik and Murray

[57] ABSTRACT

A tandem-type vacuum booster having a partition plate providing front and rear chambers with a booster piston and diaphragm in each chamber. A piston boss is slidably supported on the partition plate and a connecting cylinder is formed on the front chamber booster piston. A press plate is provided on the piston boss and the rear booster piston and an end plate of the connecting cylinder are coupled to the piston boss by the press plate and a plurality of bolts disposed around the piston boss with the rear booster piston and diaphragm clamped between the press plate and piston boss. The front ends of the bolts are disposed to come closer to the piston boss axis than the rear ends. The bolt heads are also received in recesses provided in the press plate to prevent relative rotation between the bolts and press plate.

7 Claims, 8 Drawing Sheets

TANDEN-TYPE VACUUM BOOSTER

BACKGROUND OF THE INVENTION

1. Field of the Invention

The present invention relates to a tandem-type vacuum booster and more particularly to a vacuum booster of the type wherein a partition plate is secured to a booster shell to divide the interior thereof into a front shell chamber and a rear shell chamber, the front shell chamber being divided into a front-side front vacuum chamber and a rear-side front operation chamber by a front booster piston and a front diaphragm superposed on the rear surface of the front booster piston, the rear shell chamber being divided into a front-side rear vacuum chamber and a rear-side rear operation chamber by a rear booster piston and a rear diaphragm superposed on the rear surface of the rear booster piston, the front booster piston and diaphragm and the rear booster piston and diaphragm being connected together via a piston boss which is slidably supported on the partition plate and leads to an output rod, and wherein a valve cylinder is formed continuously from the rear end of the piston boss and is slidably supported on the rear wall of the booster shell, and in the valve cylinder are disposed an input rod capable of moving forwards and rearwards and a control valve for alternately communicating both the front and rear operation chambers with the atmospheric air or the front and rear vacuum chambers.

2. Description of the Prior Art

A conventional tandem-type vacuum booster employs a piston boss which is divided into two parts in its axial direction, these divided parts serving to clamp and hold therebetween the rear booster piston and the rear diaphragm, the divided parts being connected together at their central portions by a screw member which is also used to fix the end wall plate of a connecting cylinder extending from the front booster piston onto an end surface of the piston boss. See Japanese Utility Model Application Laid Open No. 205859/1986, for example.

In a prior art structure, however, the piston boss is generally provided therein with a plurality of ports for communicating the operation chambers with the vacuum chambers and the atmosphere and if the piston boss is divided axially into two parts as suggested above, it then becomes necessary to interpose a seal member between the fitted surfaces of the divided parts so as to surround each communicating port at the time of coupling the two parts. This makes the structure complicated. Moreover, in the process of fixing the connecting cylinder of the front booster piston to the central portion of the piston boss by a screw member, the tightening torque of the screw member may cause rotation of the front booster piston, resulting in that the front diaphragm is undesirably twisted. Such twisting of the front diaphragm would undesirably deteriorate the sealing property and durability.

SUMMARY OF THE INVENTION

The present invention has been proposed in view of the above and its object is to provide a tandem-type vacuum booster having a simple structure of which the piston boss can be formed in a unitary structure and wherein respective diaphragms can be held in their proper state without being twisted at the time of assembly.

Another object of the invention is to provide a tandem-type vacuum booster which has an enhanced boosting characteristic by minimizing the reduction in pressure receiving area of the front booster piston which would conventionally be caused by the provision of the piston boss.

In order to achieve the above objects, the present invention provides a tandem-type vacuum booster wherein three components, that is, the piston boss, the end wall plate of the connecting cylinder which is continuously formed from the front booster piston and is superposed on the front end portion of the piston boss, and a press plate superposed on the rear end portion of the piston boss for clamping the rear booster piston in cooperation with the piston boss are coupled into a unitary structure by a plurality of through bolts which are disposed around an axis of the piston boss while clamping the inner peripheral bead of the front diaphragm between the front booster piston and the piston boss and also clamping the inner peripheral bead of the rear diaphragm between the rear booster piston and the press plate.

The invention provides, in addition to the above arrangement, further that the plurality of through bolts surrounding the axis of the piston boss are so provided as to come closer to the piston boss axis at their front ends than at the rear ends.

Owing to the above arrangements, it is possible to fix the front and rear booster pistons as well as the front and rear diaphragms to the piston boss without dividing the boss into parts. This leads to a simplified structure of the booster. Moreover, the fixed relationship of those components is achieved by a plurality of through bolts which are arranged around the axis of the piston boss so that the front booster piston and the press plate are prevented their rotative movement by the through bolts. Accordingly, the front and rear diaphragms are not twisted in an assembling operation, assuring the sealing property and durability of the diaphragms.

Due to the arrangement that the plurality of through bolts are inclined so as to come closer to the piston boss axis at their front ends, it is made possible to reduce the diameter of that portion of the piston boss which is supported on the partition plate without being disturbed by the through bolts. As a result, the reduction in the pressure receiving area of the front booster piston caused by the provision of the piston boss is minimized to enhance the boosting characteristic of the vacuum booster.

In addition, if the through bolts for fixing the piston boss, the end wall plate of the connecting cylinder and the press plate together are inserted from the side of the press plate and then nuts are screw-fitted to tip ends of the bolts while placing head portions of the bolts in engagement with recess parts formed on the press plate against rotation, it can be performed reliably to tighten the nuts, which are screw-fitted on the through bolts, without using a separate tool for holding the through bolts against rotation, thus facilitating the work of assembling the booster. Moreover, since the tightening torque of the nuts is received by the press plate and is not applied to the piston boss, the piston boss is formed advantageously in strength.

The above and other objects, features and advantages of the present invention will become apparent from reading the following detailed description of preferred embodiments made in conjunction with the accompanying drawings.

BRIEF DESCRIPTION OF THE DRAWINGS

FIGS. 1–4 show a first embodiment of a tandem-type vacuum booster according to the invention wherein FIG. 1 is a side view in longitudinal section of the booster in a rest state, FIG. 2 and FIG. 3 are sectional views taken along lines II—II and III—III of FIG. 1, and FIG. 4 is a side view in partly longitudinal section of the booster in a state immediately before it returns to the rest state after the boosting operation.

FIGS. 5–8 show a second embodiment of a tandem-type vacuum booster according to the invention wherein FIG. 5 is a side view in longitudinal section of the booster in a rest state, FIG. 6 and FIG. 7 are sectional views taken along lines VI—VI and VII—VII of FIG. 5, and FIG. 8 is a side view in partly longitudinal section of the booster in a state immediately before it returns to the rest state after the boosting operation.

DESCRIPTION OF THE PREFERRED EMBODIMENTS

Some preferred embodiments according to the invention will be described hereinafter in conjunction with the accompanying drawings.

Figure 1:
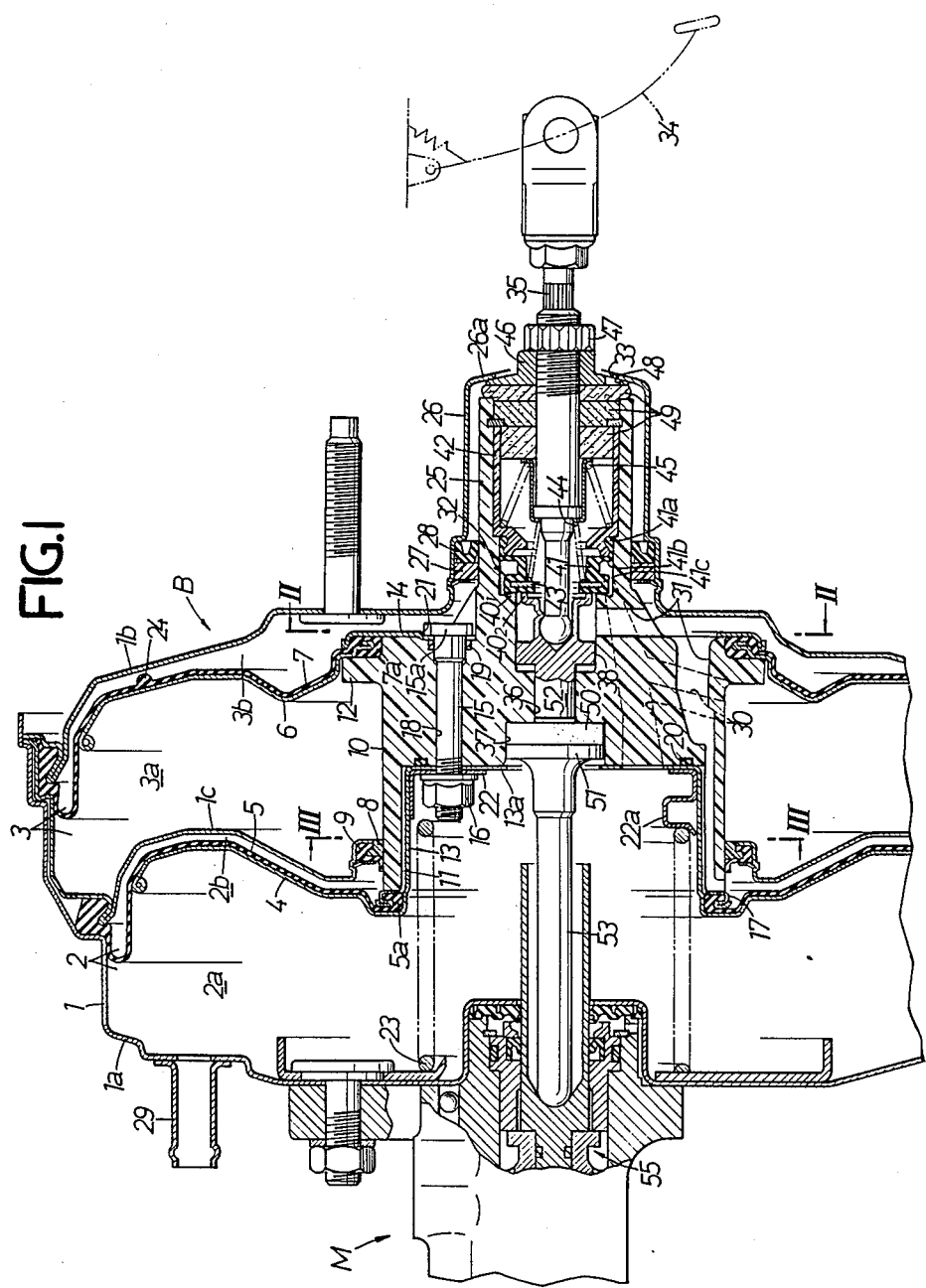
Figure 2:
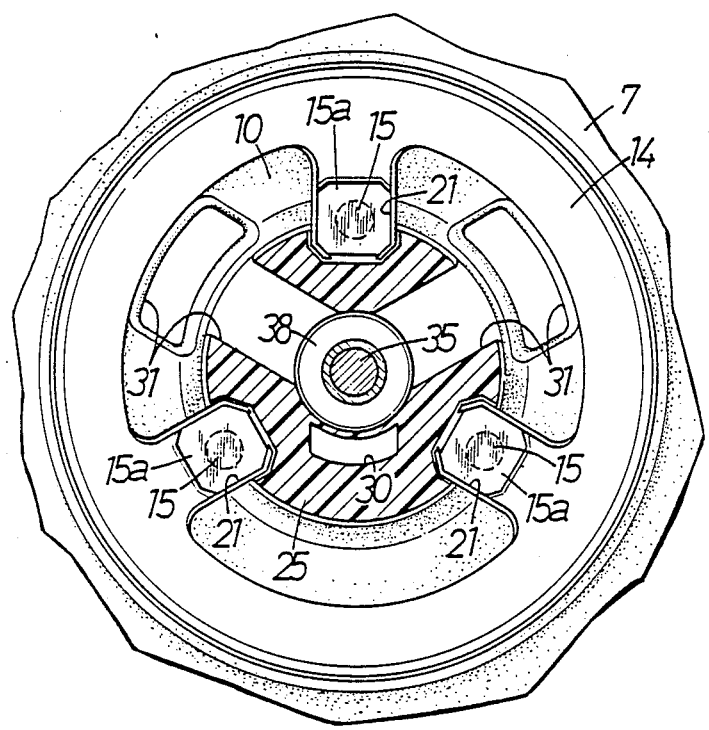
Figure 3:
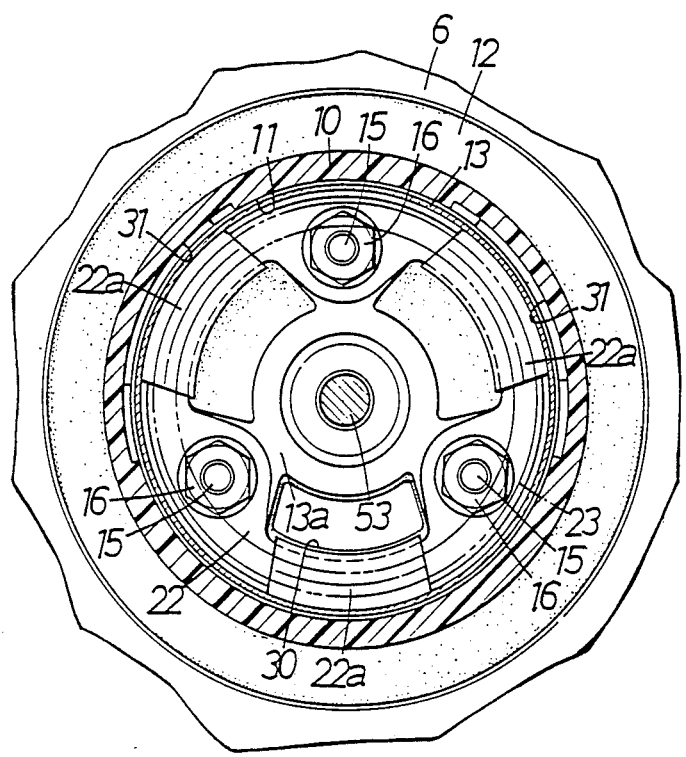
Figure 4:
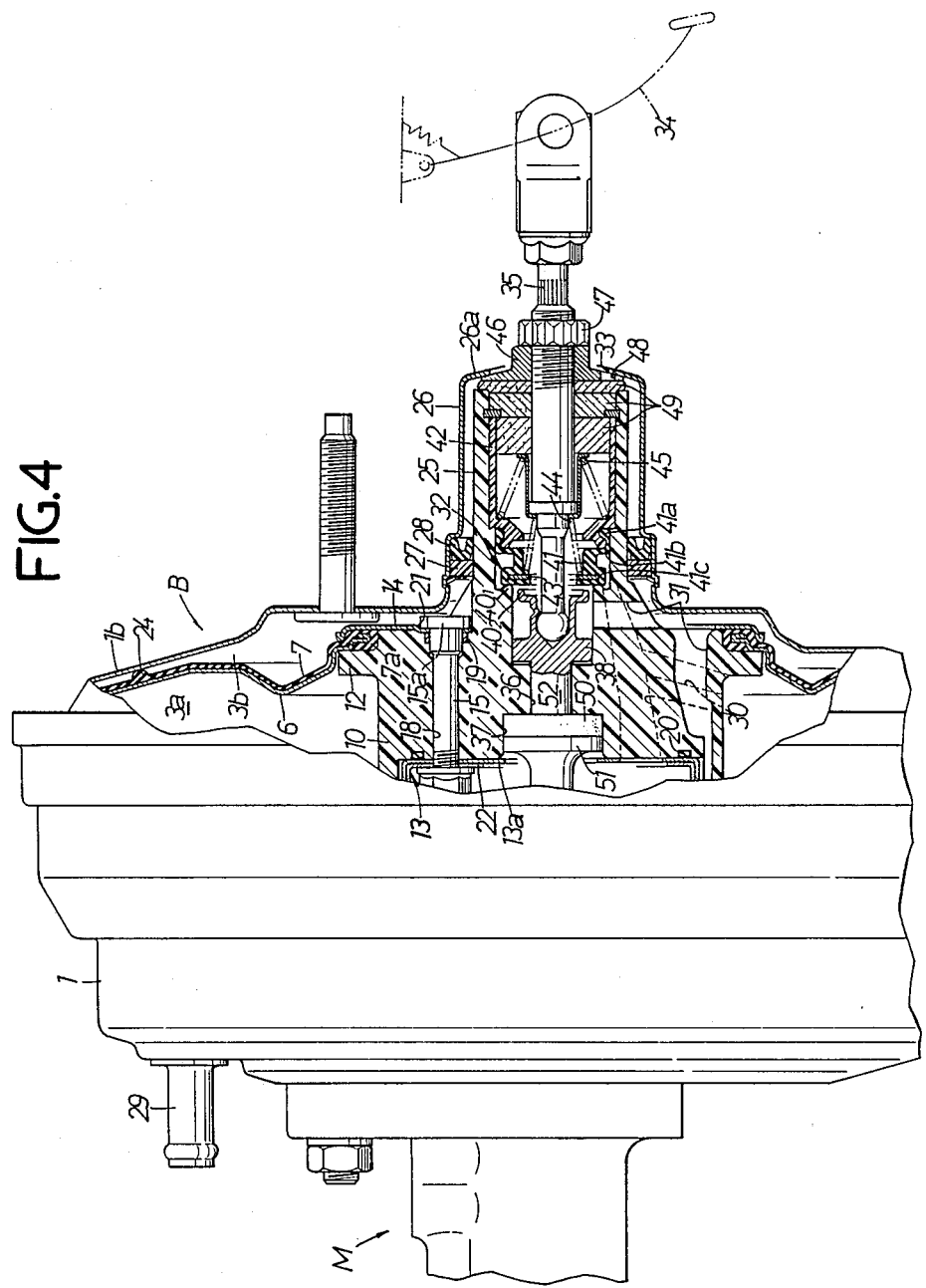
Figure 5:
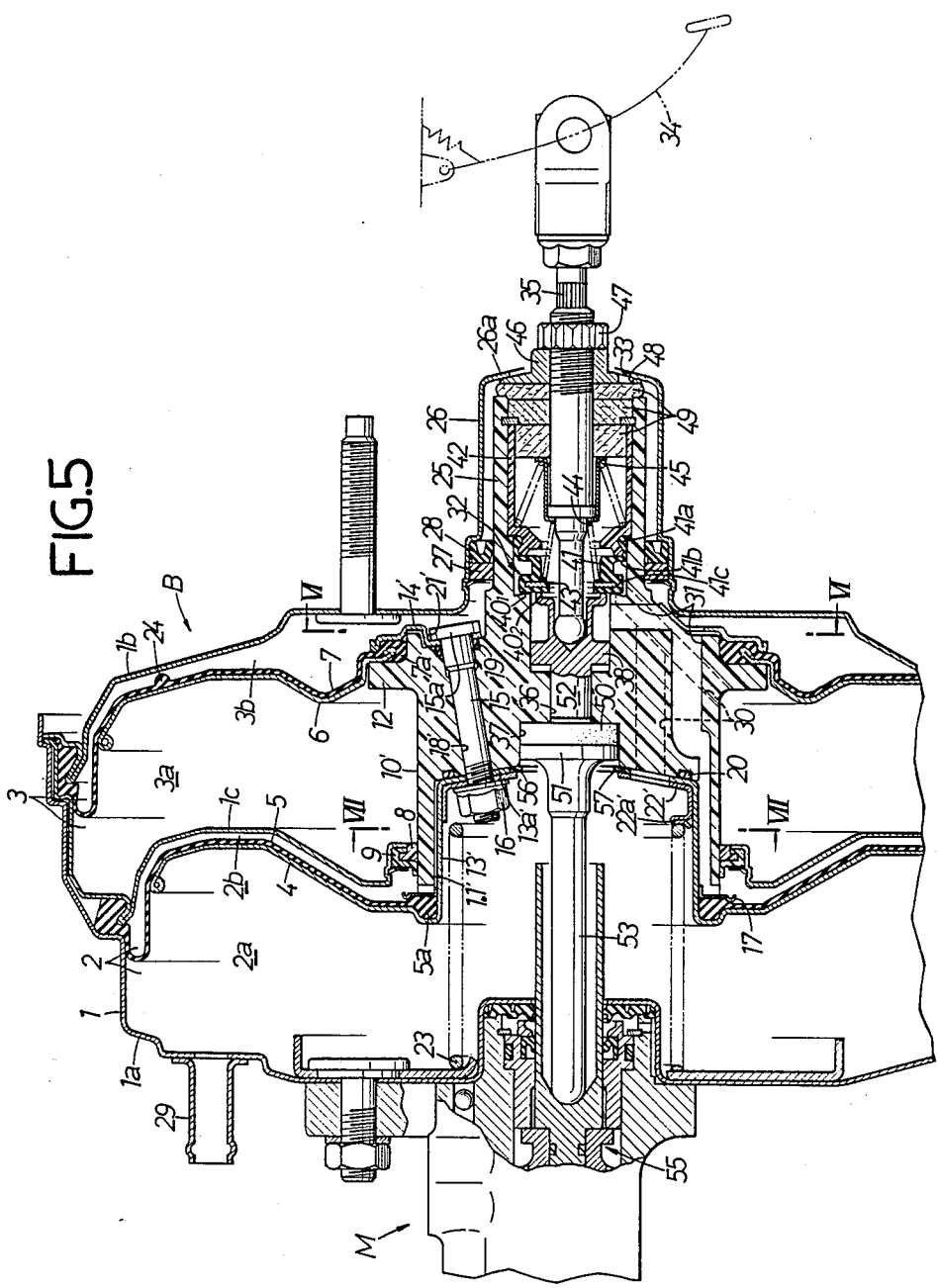
Figure 6:
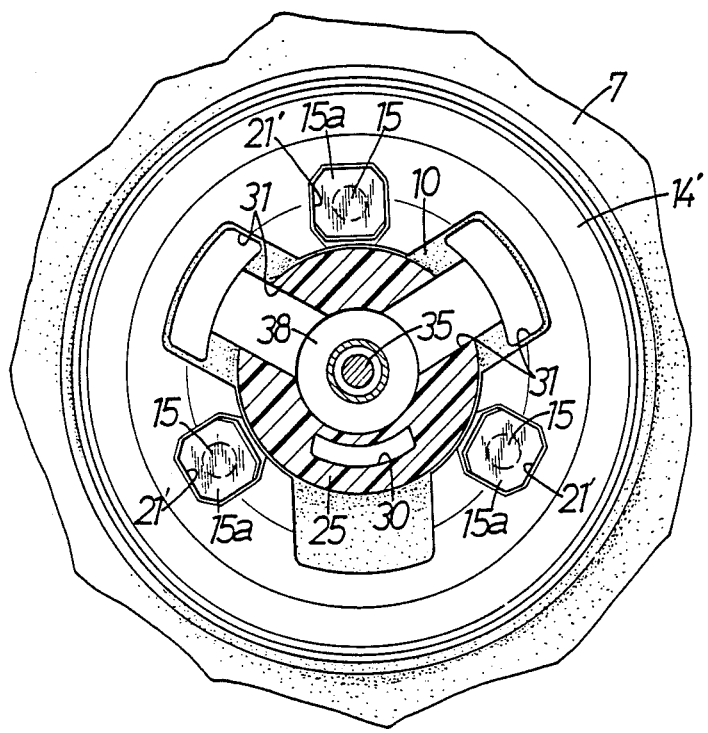
Figure 7:
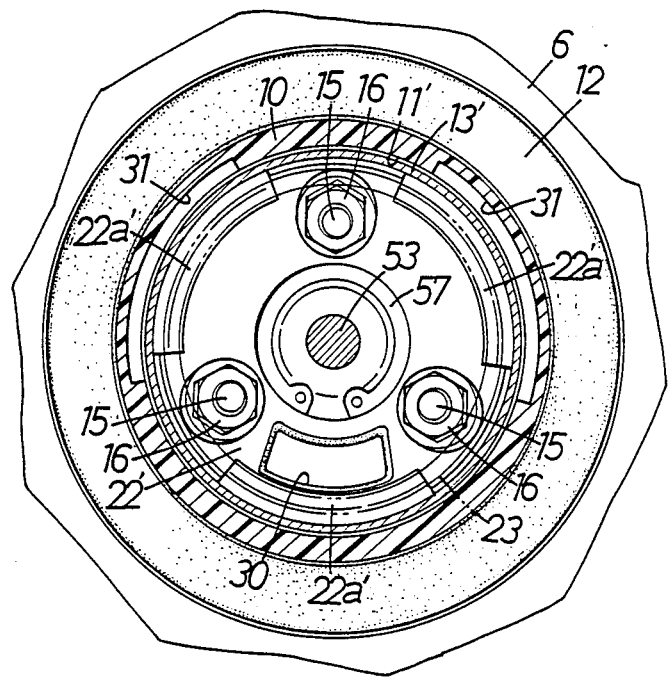
Figure 8:
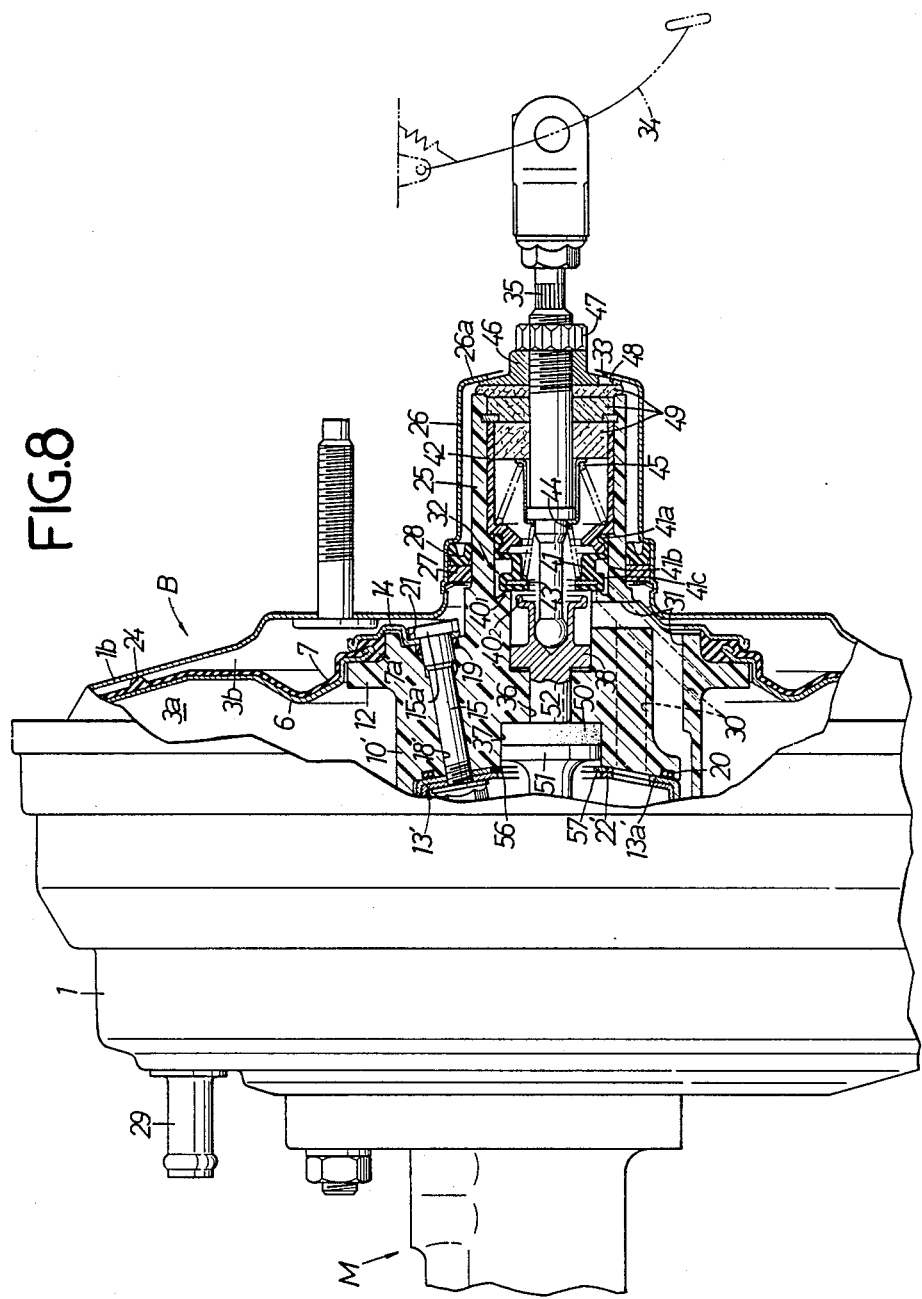

FIGS. 1–4 show a first embodiment. Referring first to FIG. 1, a tandem-type vacuum booster B has a booster shell 1 which is mounted at its front face with a brake master cylinder M which is operable by the booster B.

The booster shell 1 comprises a pair of front and rear shell halves 1a and 1b which are coupled together at their opposed ends, and an annular partition plate 1c clamped between the shell halves and dividing the interior of the booster shell 1 into a front shell chamber 2 and a rear shell chamber 3. The rear shell half 1b is carried on a vehicle body, not shown.

The front shell chamber 2 is divided into a front vacuum chamber 2a on the front side and a front operation chamber 2b on the rear side by a front booster piston 4 housed in the chamber 2 in a forwardly and rearwardly reciprocatable manner as well as by a front diaphragm 5 which is superposed and fixed on the rear surface of the front booster piston 4 and which is clamped between the front shell half 1a and the partition plate 1c. The rear shell chamber 3 is divided into a rear vacuum chamber 3a on the front side and a rear operation chamber 3b on the rear side by a rear booster piston 6 which is housed in the chamber 3 for a forward and rearward reciprocating movement and by a rear diaphragm 7 which is superposed and fixed on the rear surface of the rear booster piston 6 and which is held along with the partition plate 1c between both the shell halves 1a and 1b.

The front and rear booster pistons 4 and 6 are each formed of a steel plate into an annular shape and these pistons are fixed in the manner described below onto opposite ends of a cylindrical piston boss 10 which is formed of a synthetic resin material and is carried slidably on the inner peripheral part of the partition plate 1c via a bush 8 and a seal member 9.

That is, the piston boss 10 is formed at its front end surface with a circular recess part 11 having a depth of about one half of the axial length of the boss 10 and a flange 12 is projected radially from the outer peripheral surface of the piston boss 10 at a position distanced somewhat forwardly from the rear end of the boss. Into the circular recess part 11 is fitted a connecting cylinder 13 which is formed continuously from the inner peripheral end of the front booster piston 4 and is equipped with an end wall plate 13a. A press plate 14 is superposed on the rear end surface of the piston boss 10 for clamping the inner peripheral end of the rear booster piston 6 in cooperation with the radial flange 12. The three components, that is, the press plate 14, the piston boss 10 and the end wall plate 13a are coupled together into a unitary structure by means of a plurality of (three in the illustrated embodiment) through bolts 15 surrounding the axis of the piston boss 10 and nuts 16 screw-fitted to the respective bolts 15.

At the time of coupling of the components, an inner peripheral bead 5a of the front diaphragm 5 and an annular retainer 17 enclosing the outer peripheral surface and rear surface of the bead 5a are clamped between the front booster piston 4 and the front end surface of the piston boss 10, whereas an inner peripheral bead 7a of the rear diaphragm 7 enclosing the inner peripheral end of the rear booster piston 6 is clamped between the flange 12 and the press plate 14. Accordingly, when the front and rear booster pistons 4 and 6 and the piston boss 10 are coupled to one another, the inner peripheral beads 5a and 7a of respective diaphragms 5 and 7 are fixed to corresponding booster pistons 4 and 6.

Bolt holes 18 are provided in the piston boss 10 for insertion of the through bolts 15 and these holes 18 are equipped with seal members 19 to prevent communication therethrough between the front vacuum chamber 2a and the rear operation chamber 3b. A seal member 20 is further provided between the end wall plate 13a and the piston boss 10 so as to surround the plurality of through bolts 15 whereby first and second branched ports 30 and 31 to be described later are blocked their mutual communication through any clearances formed between abutting surfaces of the end wall plate 13 and the piston boss 10.

Each through bolt 15 has an angular-shaped head, in the illustrated embodiment a square head 15a, located on the side of the rear operation chamber 3b in the mounted position and a recess part 21 of the same shape as the square head 15a (see FIG. 2) is formed in the press plate 14 for receiving the head 15a against relative rotation.

The through bolts 15 and nuts 16 are also utilized to fix a seat plate 22 to the end wall plate 13a of the connecting cylinder 13. The seat plate 22 is partially raised at portions thereof between the adjacent nuts 16 to a level higher than the nuts 16 thereby to provide a plurality of seat parts 22a (see FIG. 3). A return spring 23 is mounted in compression between these seat parts 22a and the front shell half 1a. The resilient force of the return spring 23 urges the piston boss 10, and therefore both the booster pistons 4 and 6, in a retracted direction at all times. The limit of retraction of the booster pistons 4 and 6 is defined by allowing a number of projections 24 raised on the rear surface of the rear diaphragm 6 to abut against the rear wall of the booster shell 1.

A valve cylinder 25 is integrally extended from the rear end of the piston boss 10 and this valve cylinder 25 is slidably supported via a bush 27 and a seal member 28 on a rear extension cylinder 26 which is projected from the rear wall of the booster shell 1 so as to cover the valve cylinder 25.

The front vacuum chamber 2a is connected to a vacuum pressure source not shown (for example, to the interior of an intake manifold of an internal combustion engine) via a vacuum introduction pipe 29 and also to the rear vacuum chamber 3a via the first branched port 30 formed in the piston boss 10. The front and rear operation chambers 2b and 3b are communicated with each other via the second branched port 31 formed in the piston boss 10 and it is further arranged that these operation chambers 2b and 3b are placed in alternate communication by a control valve 32 with the front and rear vacuum chambers 2a and 3a or an atmospheric air introduction port 33 which is opened at an end wall 26a of the rear extension cylinder 26.

Within the valve cylinder 25 are disposed an input rod 35 leading to a brake pedal 34 and the control valve 32 controlled by the input rod 35 in the following manner. The valve cylinder 25 slidably receives in its front part a valve piston 38 which is in turn connected with the front end of the input rod 35, which penetrates through the atmospheric air introduction port 33, so as to allow swinging motion of the rod 35 around its front end. The inner peripheral surface of the valve cylinder 25 is partly projected radially inwards to form an annular first valve seat $40_1$ so as to surround an annular second valve seat $40_2$ which is formed at the rear end surface of the valve piston 38. A valve body 41 is disposed within the valve cylinder 25 for collaborating action with the valve seats $40_1$ and $40_2$. The valve member 41 is made of rubber and has a tubular shape with its front and rear ends open. The rear end part or base end part 41a of the valve body 41 is held in intimate contact with the inner peripheral surface of the valve cylinder 25 by a retainer sleeve 42 which is fitted to the inner peripheral surface of the valve cylinder 25. The valve body 41 further includes a flexible part 41b of a thin thickness bent radially inwardly from the base end part 41a and a valve part 41c of a large thickness extended from the front end of the flexible part 41b. The valve part 41c is located opposed to the first and second valve seats $40_1$ and $40_2$.

The valve part 41c is movable forwardly and rearwardly due to deformation of the flexible part 41b and is adapted at its advanced position to seat on the first and second valve seats $40_1$ and $40_2$ and at the time of retraction thereof to be received by the front end of the retainer sleeve 42.

An annular reinforcing plate 43 is embedded in the valve part 41c and a valve spring 44 is compressed between the reinforcing plate 43 and the input rod 35 so as to bias the valve part 41c toward both the valve seats $40_1$ and $40_2$.

To the inner surface of the valve cylinder 25 ar opened one end of the first branched port 30 at a position outside of the first valve seat $40_1$ and one end of the second branched port 31 at a position inside of the valve seat $40_1$.

The inside of the second valve seat $40_2$ is communicated with the atmospheric air introduction port 33 through the hollow interiors of the valve body 41 and the retainer sleeve 42.

The valve body 41, the valve spring 44, the first valve seat $40_1$ and the second valve seat $40_2$ constitute the control valve 32.

A return spring 45 is compressed between the input rod 35 and the retainer sleeve 42 so as to urge the input rod 35 toward its limit of retraction.

The limit of retraction of the input rod 35 is defined by permitting a stopper plate 46, which is screw-engaged on the input rod 35 so as to be adjustable its position relative to the input rod in an advanced and retracted manner, to abut against the inner surface of the end wall 26a of rear extension cylinder 26. Therefore, rotating the stopper plate 46 results in a change in the screw-engaged position of the stopper plate 46 on the input rod 35 thus enabling the retraction limit of the input rod 35 to be displaced forwardly or rearwardly. Fixing of the stopper plate 46 after adjustment is effected by tightening a lock nut 47 which is also screw-engaged on the input rod 35. The stopper plate 46 is provided with a ventilation hole 48 so as not to block the atmospheric air introduction port 33.

An air filter 49 is mounted to the valve cylinder 25 so as to surround the input rod 35 for the purpose of filtering air to be sucked into the valve cylinder 25 through the atmospheric air introduction port 33. The air filter 49 is formed of a material soft enough not to prevent relative displacement between the input rod 35 and the valve cylinder 25.

The piston boss 10 is formed with a larger cylinder bore 37 opening to the front central portion thereof and a smaller cylinder bore 36 opening at opposite ends thereof to the larger cylinder bore 37 and the valve cylinder 25, respectively. Within the smaller cylinder bore 36 is slided a reaction piston 52 which is formed integral with or abutted against the valve piston 38. Within the larger cylinder bore 37 are slided a resilient piston 50 opposed to the reaction piston 52 and an output piston 51 superposed on the front surface of the resilient piston 50. The inner peripheral edge of the end wall plate 13a is extended to partly cover the opening of the larger cylinder bore 37 and serves to prevent the output piston 51 from falling off from the larger cylinder bore 37.

An output rod 53 is projected from the front surface of the output piston 51 and is operatively connected to a piston 55 of the afore-mentioned brake master cylinder M.

The operation of this embodiment will now be described. When the vacuum booster B is in a rest state, the control valve 32 assumes a neutral position with its valve part 41c being seated on the first and second valve seats $40_1$ and $40_2$ thus placing the front and rear operation chambers 2b and 3b out of communication with both the vacuum chambers 2a and 3a as well as with the atmospheric air introduction port 33. With the control valve 32 being held in such position, vacuum pressure from the vacuum pressure source is supplied through the vacuum introduction pipe 29 into and stored in both the vacuum chambers 2a and 3a whereas in the operation chambers 2b and 3b vacuum pressure which has been diluted appropriately with the atmospheric air is stored. Thereby a difference in pressure is generated between the front vacuum chamber 2a and operation chamber 2b and also between the rear vacuum chamber 3a and operation chamber 3b and this difference in pressure gives a slight advancing force to the front and rear booster pistons 4 and 6. Such advancing force is so balanced with the resilient force of the return spring 23 as to hold the booster pistons 4 and 6 at positions slightly advanced from their respective limits of retraction.

If the brake pedal 34 is depressed in order to brake a vehicle and the input rod 35 and valve piston 38 are caused to advance, since the booster pistons 4 and 6 remain stationary at the initial stage of operation, the second valve seat $40_2$ promptly moves apart from the valve part 41c to bring both the operation chambers 2b and 3b into communication with the atmospheric air introduction port 33. As a result, the atmospheric air is swiftly introduced from the atmospheric air introduction port 33 into the operation chambers 2b and 3b through between the second valve seat $40_2$ and valve part 41c and through the second branched port 31. Pressure within the operation chambers 2b and 3b thus rises to a level higher than the pressure in the vacuum chambers 2a and 3a to provide a large advancing force based on a difference in pressure across the chambers 2a, 3a and 2b, 3b, which causes both the booster pistons 4 and 6 to advance in a well-responded manner against the force of the return spring 23. In consequence, the piston 55 of brake master cylinder M is driven forwards through the medium of the output rod 53. The brake master cylinder M is thus operated without delay in response to depressing the brake pedal 34 to brake the vehicle.

During this braking operation, the valve piston 38 is advanced along with the input rod 35 to abut against the resilient piston 50 via the reaction piston 52. The resilient piston 50 is at this time deformed and bulged towards the smaller cylinder bore 36 upon receipt of the operation reaction force from both the booster pistons 4 and 6 and a part of the reaction force acts on the reaction piston 52. Such partial reaction force is fed back to the brake pedal 34 via the valve piston 38 and input rod 35. This reacting force allows an operator to sense the output of the output rod 53, that is, the magnitude of the braking force.

When the depressing force on the brake pedal 34 or input to the input rod 35 increases to such a level that the output from the output rod 53 exceeds the limit of boosting operation, the valve piston 38 is caused to abut at its front surface against the piston boss 10 and then all the input is transmitted to the output rod 53 via the valve piston 38, the piston boss 10, the resilient piston 50 and the output piston 51. As a result, the sum of an advancing force generated by a pressure difference caused at the booster pistons 4 and 6 and an advancing force derived from the input is outputted from the output rod 53.

Next, if the depressing force is released from the brake pedal 34, the input rod 35 first starts to retract together with the valve piston 38 due to the resilient force of the return spring 45 to permit the second valve seat $40_2$ to be seated on the valve part 41c of valve body 41 and simultaneously permit the valve part 41c to be separated from the first valve seat $40_1$. Thereby the operation chambers 2b and 3b are communicated with the vacuum chambers 2a and 3a, respectively, to immediately eliminate the difference in pressure across each of the booster pistons 4 and 6. Accordingly, the booster pistons 4 and 6 are retracted by the resilient force of the return spring 23 while releasing the operation of the brake master cylinder M. When the input rod 35 returns to its limit of retraction obtained by the stopper plate 46 abutting against the end wall 26a of rear extension cylinder 26, the rear booster piston 6 once returns to its limit of retraction shown in FIG. 4 with the projections 24 on the rear diaphragm 7 being permitted to abut against the rear wall of booster shell 1 and thereafter the first valve seat $40_1$ seats on the valve part 41c while the second valve seat $40_2$ moves apart from the valve part 41c. This admits the atmospheric air into both the operation chambers 2b and 3b again and causes some difference in pressure between the vacuum chambers and the operation chambers across the booster pistons 4 and 6 to advance the booster pistons a slight distance. Such advancing movement eliminates a small clearance which has been present between the second valve seat $40_2$ and the valve part 41c thereby bringing the control valve 32 into its initial neutral position. The operation chambers 2b and 3b have thus stored therein a vacuum pressure which has been diluted with the atmospheric air and the vacuum booster B assumes the rest state of FIG. 1.

In the tandem-type vacuum booster B constructed above, the three components, that is, the piston boss 10, the end wall plate 13a of the connecting cylinder 13 integrally formed with the front booster piston 4, and the press plate 14 for clamping the rear booster piston 6 in cooperation with the piston boss 10 are coupled together by a plurality of through bolts 15 disposed surrounding the axis of the piston boss 10 and nuts 16 screw-engaged on the bolts 15 and moreover the inner peripheral bead 5a of front diaphragm is clamped and held between the front booster piston 4 and piston boss 10 whereas the inner peripheral bead 7a of rear diaphragm 7 is clamped and held between the rear booster piston 6 and press plate 14. With this arrangement, the front and rear booster pistons 4 and 6 and the front and rear diaphragms 5 and 7 can be coupled unitarily to the piston boss 10 without dividing the piston boss 10 into parts in a conventional manner. Furthermore since the end wall plate 13a of connecting cylinder 13 and the press plate 14 are suppressed their rotative movement by the plurality of through bolts 15, it is assured that the plates do not rotate at the time of tightening the nuts 16 thereby preventing twisting of the front and rear diaphragms 5 and 7.

Since the square heads 15a of respective through bolts 15 are engaged with the associated square recess parts 21 on the press plate 14 in a rotation-proof manner, no special tool is required for preventing rotation of the bolts 15 during their assembling step and the nuts 16 can be tightened up reliably. In addition, the tightening torque of the nuts 16 is received by the press plate 14 and is not transmitted to the piston boss 10 so that the piston boss 10 is, even if formed of a synthetic resin material, free of twisting and breakage which would otherwise be caused due to a strong tightening torque of the nuts 16.

A second embodiment according to the invention will next be described with reference to FIGS. 5–8.

As will be apparent from the drawings, this second embodiment differs from the first embodiment in that respective through bolts 15 and bolt holes 18' through which the bolts penetrate are inclined so as to come closer to the axis of the piston boss 10' at their forward side than the rear side, that the circular recess part 11' has its bottom wall inclined in a tapered manner to have a gradually increased depth towards the axis of the piston boss 10' and the end wall plate 13a' of connecting cylinder 13' as well as the seat plate 22' are inclined in a tapered manner in conformity with the bottom wall of the circular recess part 11', and further in that in order to prevent fall off of the output piston 51, an annular groove 56 is defined between the inner peripheral edge of the end wall plate 13a' of the connecting cylinder 13' and the opposed faces of the piston boss 10' and seat plate 22' and into this annular groove 56 is mounted a circlip 57 which is exposed to the larger cylinder bore 37. It should be also noted that parts on the rear surface of the piston boss 10' for supporting the square heads 15a of through bolts 15 and the recess parts 21' on the press plate 14' are likewise inclined so as to conform to the inclined bottom wall of circular recess part 11'. The second embodiment is constructed basically in the similar manner as the first embodiment other than the above portions and therefore corresponding parts are identified by the same reference numerals and characters.

In this second embodiment, the front ends of the through bolts 15 which are screw-engaged by the nuts 16 are located closer to the axis of the piston boss 10' than in the first embodiment so that it becomes possible to reduce the diameter of that portion of the piston boss 10' which is carried by the partition plate 1c without being disturbed by the bolts 15. This results in that reduction in the pressure receiving area of the front booster piston 4 which may be caused by the piston boss 10' can be minimized.

What is claimed is:

1. A tandem-type vacuum booster comprising a booster shell and a partition plate secured to the booster shell to divide an interior thereof into a front shell chamber and a rear shell chamber, the front shell chamber being divided into a front-side front vacuum chamber and a rear-side front operation chamber by a front booster piston and a front diaphragm superposed on a rear surface of the front booster piston, the rear shell chamber being divided into a frontside rear vacuum chamber and a rear-side rear operation chamber by a rear booster piston and a rear diaphragm superposed on a rear surface of the rear booster piston, the front booster piston, the front diaphragm, the rear booster piston and the rear diaphragm being connected together via a piston boss which is slidably supported on the partition plate and leads to an output rod, wherein a valve cylinder is formed continuously from a rear end of the piston boss and is slidably supported on a rear wall of the booster shell, and in the valve cylinder are disposed an input rod capable of moving forwards and rearwards and a control valve for alternately communicating both the front and rear operation chambers with an atmospheric air and the front and rear vacuum chambers, and wherein a connecting cylinder is formed continuously from the front booster piston and is superposed on a front end of the piston boss whereas a press plate is superposed on the rear end of the piston boss for clamping the rear booster piston in cooperation with the piston boss, a plurality of through bolts being disposed around an axis of the piston boss and coupling the piston boss, an end wall plate of the connecting cylinder and the press plate into a unitary structure while holding an inner peripheral bead of the front diaphragm between the front booster piston and the piston boss as well as holding an inner peripheral bead of the rear diaphragm between the rear booster piston and the press plate.

2. A tandem-type vacuum booster comprising a booster shell and a partition plate secured to the booster shell to divide an interior thereof into a front shell chamber and a rear shell chamber, the front shell chamber being divided into a front-side front vacuum chamber and a rear-side front operation chamber by a front booster piston and a front diaphragm superposed on a rear surface of the front booster piston, the rear shell chamber being divided into a front-side rear vacuum chamber and a rear-side rear operation chamber by a rear booster piston and a rear diaphragm superposed on a rear surface of the rear booster piston, the front booster piston, the front diaphragm, the rear booster piston and the rear diaphragm being connected together via a piston boss which is slidably supported on the partition plate and leads to an output rod, wherein a valve cylinder is formed continuously from a rear end of the piston boss and is slidably supported on a rear wall of the booster shell, and in the valve cylinder are disposed an input rod capable of moving forwards and rearwards and a control valve for alternately communicating both the front and rear operation chambers with an atmospheric air and the front and rear vacuum chambers, and wherein a connecting cylinder is formed continuously from the front booster piston and is superposed on a front end of the piston boss whereas a press plate is superposed on the rear end of the piston boss for clamping the rear booster piston in cooperation with the piston boss, a plurality of through bolts being disposed around an axis of the piston boss so as to come closer to the axis of the piston boss at front ends thereof than at rear ends thereof, the through bolts coupling the piston boss, an end wall plate of the connecting cylinder and the press plate into a unitary structure while holding an inner peripheral bead of the front diaphragm between the front booster piston and the piston boss as well as holding an inner peripheral bead of the rear diaphragm between the rear booster piston and the press plate.

3. A tandem-type vacuum booster according to claim 1 or 2, wherein a plurality of bolt holes for insertion of the through bolts are provided in the piston boss so as to axially penetrate therethrough and seal means is provided in each of the bolt holes for preventing communication between said front vacuum chamber and said rear operation chamber through the bolt holes.

4. A tandem-type vacuum booster according to claim 1 or 2, wherein said plurality of through bolts each have tip ends and heads, nuts being screw-engaged on the tip ends and the heads being engaged in recess parts formed on the press plate in a rotation-proof manner.

5. A tandem-type vacuum booster according to claim 4, wherein the heads of the through bolts are angular-shaped and the recess parts on said press plate are angular-shaped so as to meet the heads of the through bolts.

6. A tandem-type vacuum booster according to claim 1 or 2, wherein said piston boss is formed at its front end with a circular recess part having a depth of about one half of an axial length of the piston boss, the connecting cylinder of the front booster piston being so shaped as to be fitted into said circular recess part.

7. A tandem-type vacuum booster according to claim 1 or 2, wherein said valve cylinder is integrally formed with said piston boss.

* * * * *

UNITED STATES PATENT AND TRADEMARK OFFICE
CERTIFICATE OF CORRECTION

PATENT NO.   : 4,905,573
DATED        : March 6, 1990
INVENTOR(S)  : MIYAZAKI et al It is certified that error appears in the above-identified patent and that said Letters Patent is hereby corrected as shown below:

On the cover page, Item [54], "TANDEN-TYPE VACUUM BOOSTER" should read --TANDEM-TYPE VACUUM BOOSTER--.

Column 1, line 2, "TANDEN-TYPE VACUUM BOOSTER" should read --TANDEM-TYPE VACUUM BOOSTER--.

Signed and Sealed this

Twenty-third Day of July, 1991

Attest:

HARRY F. MANBECK, JR.

*Attesting Officer*  *Commissioner of Patents and Trademarks*